United States Patent [19]

Katiyar et al.

[11] Patent Number: 5,732,399
[45] Date of Patent: Mar. 24, 1998

[54] METHOD AND APPARATUS FOR ASSOCIATING CALENDAR EVENTS WITH CONTEXTUAL INFORMATION AND OTHER CALENDAR EVENTS

[75] Inventors: Dinesh H. Katiyar, Mountain View; Jaikumar Ramanathan, San Carlos, both of Calif.

[73] Assignee: Sun Microsystems, Inc., Mountain View, Calif.

[21] Appl. No.: 483,070

[22] Filed: Jun. 7, 1995

[51] Int. Cl.$^6$ ..................................... G06F 19/00
[52] U.S. Cl. ................................. 705/5; 345/339
[58] Field of Search ................ 364/401 R, 402; 705/8, 9; 345/339

[56] References Cited

U.S. PATENT DOCUMENTS

| | | | |
|---|---|---|---|
| 5,519,606 | 5/1996 | Frid-Nielsen et al. | 364/401 |
| 5,528,745 | 6/1996 | King et al. | 395/161 |
| 5,579,519 | 11/1996 | Pelletier | 395/705 |

*Primary Examiner*—Gail O. Hayes
*Assistant Examiner*—Junghoon Kenneth Oh
*Attorney, Agent, or Firm*—Blakely Sokoloff Taylor & Zafman

[57] ABSTRACT

A method and apparatus for associating scheduled events with other scheduled events and with electronic documents is provided. A user interacts with user interface controls on a computer display to specify a plurality of scheduled events. The user interface controls allow the user to specify that one or more electronic documents are related to each event, and that one or more other events are related to each event. Data representing the events and the associations between the events and electronic documents is stored on a storage device. User interface controls are provided which allow a user to see a list of the events and/or the documents that are related to a particular event. When a user changes the schedule of an event that has related events, a warning indication is generated to remind the user that the schedules of the related events may also have to be changed.

29 Claims, 8 Drawing Sheets

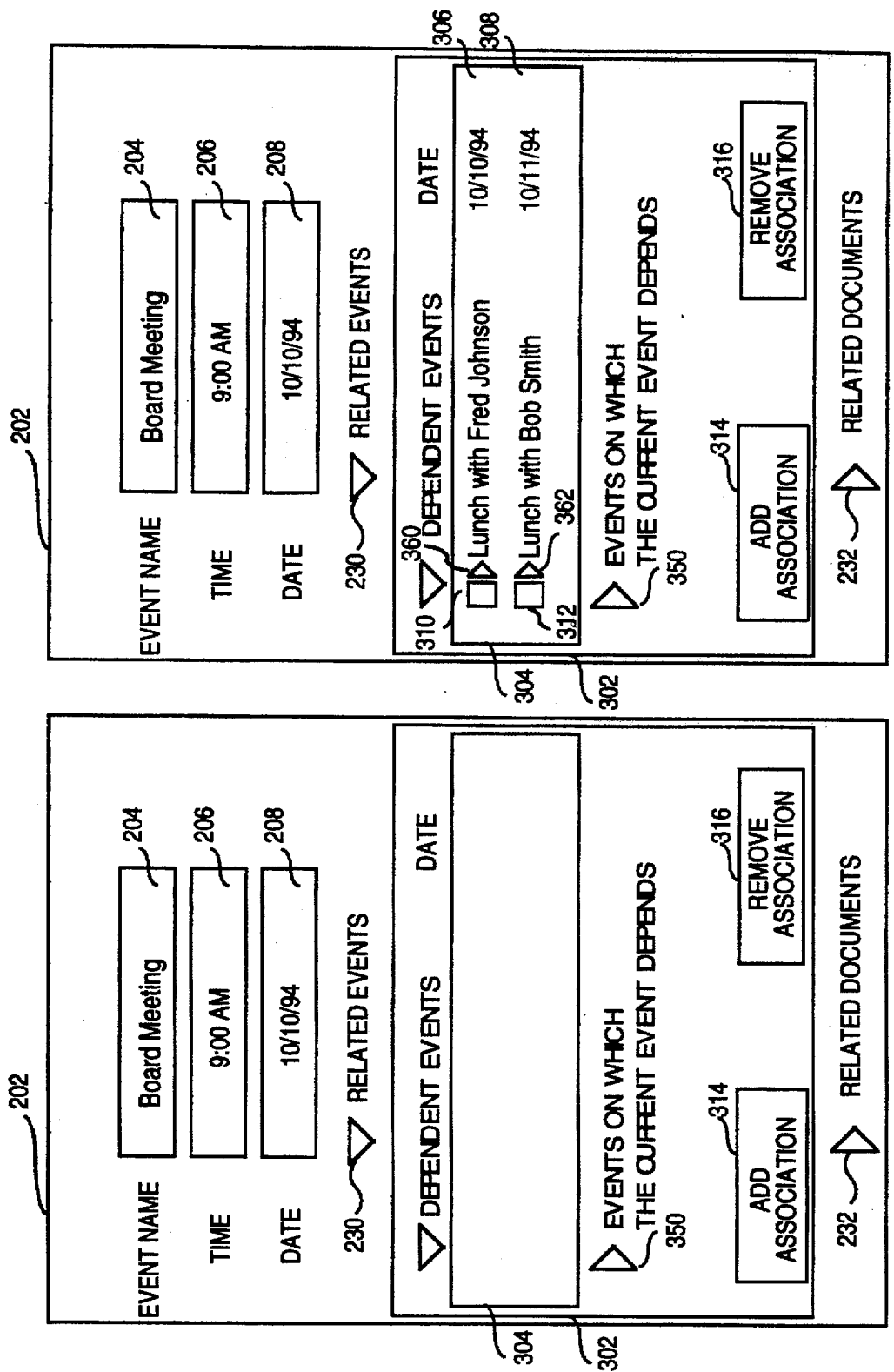

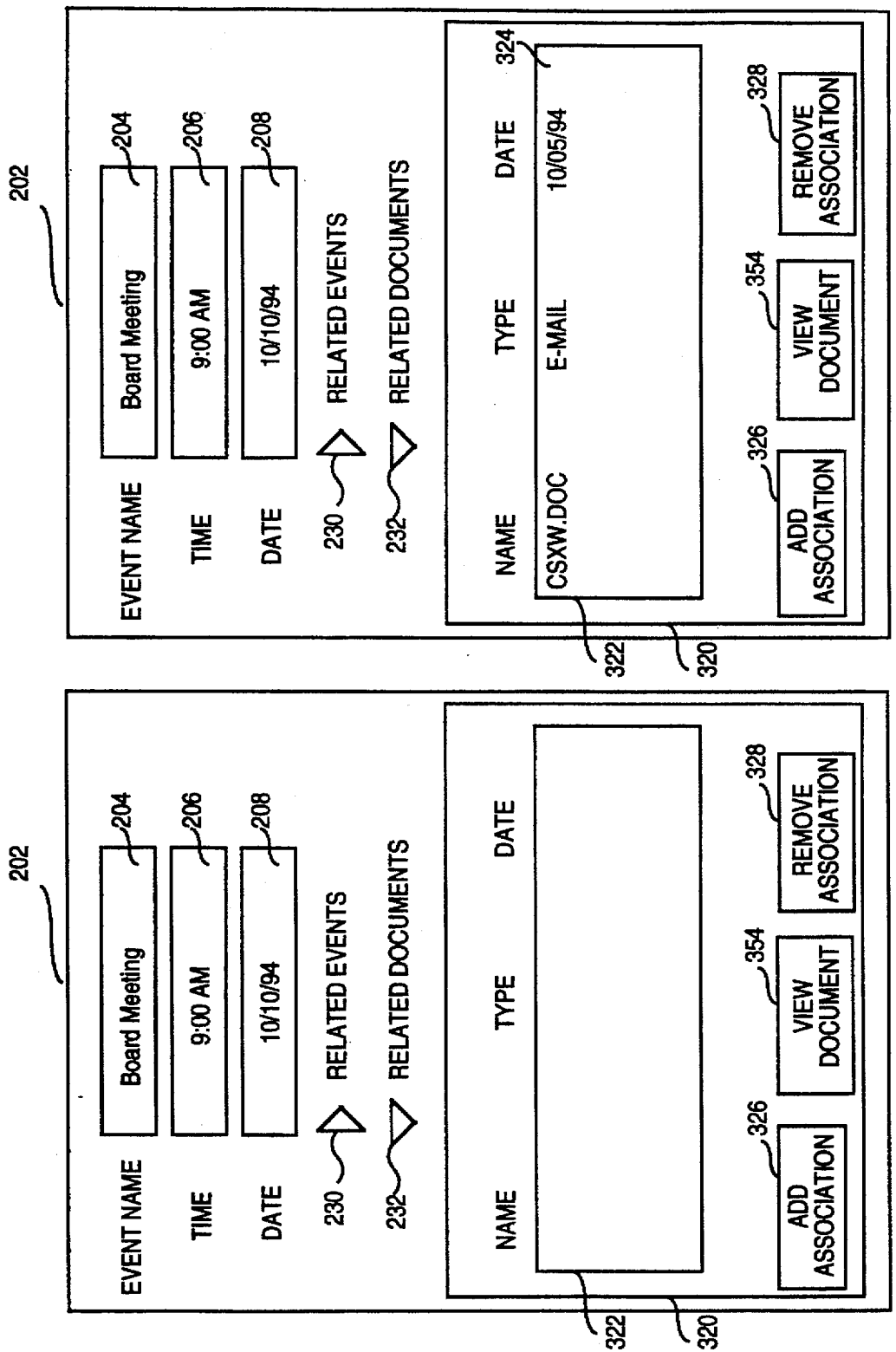

METHOD AND APPARATUS FOR ASSOCIATING CALENDAR EVENTS WITH CONTEXTUAL INFORMATION AND OTHER CALENDAR EVENTS

FIELD OF THE INVENTION

The present invention relates to a method and apparatus for scheduling events, and more specifically, to a method and apparatus for associating scheduled events with related events and electronic documents.

BACKGROUND OF THE INVENTION

Numerous software programs have been developed that allow users to store schedules of events into a computer. Typically, such programs also generate visual displays that illustrate the events that will occur during a specified time period (e.g. calendars). Using such programs, users may, for example, enter information about events that are scheduled to occur during a particular month. The software stores the information on a storage device. At any time thereafter, users may instruct the software to generate a calendar of the month. When generating the calendar, the software generates indications of the scheduled events on the appropriate days of the calendar.

Current calendar applications do not address certain types of scheduling problems. For example, problems may occur when the schedule for one event is dictated by the schedules of other events. Consider the following situation. A person X has a lunch scheduled with a person Y on Tuesday. Person X wants to have lunch with a person Z during the same week. Although Tuesday would have been more convenient for person Z, person X schedules lunch with person Z on Wednesday because of the preexisting lunch appointment with person Y. Later, person Y reschedules the lunch appointment with person X for another week. At this point, person X may have forgotten that Wednesday was more convenient for person Z. Consequently, person X fails to change the appointment with person Z from Wednesday to Tuesday, causing unnecessary inconvenience to person Z.

In the above example, the schedule of the lunch appointment with person Z was dependent on the schedule of the lunch appointment with person Y. In other circumstances, two events may be mutually dependent. For example, the results of a medical test may have to be read exactly two days after the test is performed. Consequently the schedule of the appointment to have the test performed and the schedule of the appointment to have the results examined could not be altered independently. A change in the schedule of one appointment would necessitate a change in the schedule of the other appointment to maintain the two day interval.

Often, the user of a calendar application is initially informed about an event through some type of electronic document, such as an electronic mail message. The user enters information about the event from the electronic document into the calendar application to create an appointment entry that corresponds to the event. Often, much of the information about an event is lost in the transfer of information from the document to the calendar program. For example, to cause an appointment indicator for the event to appear on the calendar generated by the calendar application, the user typically enters the schedule (time and date) of the event along with a name or label that identifies the event. Other information contained in the electronic document, such as directions to where the event will take place, instructions regarding what to bring and what to wear, the abstract of a talk, etc. is typically not transferred. This information may include graphics in addition to text. Some calendar applications simply do not support the entry of this type of additional information. Other calendar programs require the information to be re-typed or transferred through awkward cut-and-paste operations.

SUMMARY OF THE INVENTION

Based on the foregoing, it is desirable to provide a method and apparatus that allows users to identify related events. It is further desirable to provide a method and apparatus for notifying a user when a related event has been rescheduled. Further, it is desirable to provide a method and apparatus for making additional event information conveniently available to the user of a calendar application.

A method and apparatus for associating scheduled events with other scheduled events and with electronic documents is provided. A user interacts with user interface controls on a computer display to specify a plurality of scheduled events. The user interface controls allow the user to specify that one or more electronic documents are related to each event, and that one or more other events are related to each event. Data representing the events and the associations between the events and electronic documents are stored on a storage device. User interface controls are provided which allow a user to see a list of the events and/or the documents that are related to a particular event. When a user changes the schedule of an event that has related events, a warning indication is generated to remind the user that the related events may also have to be changed.

According to one aspect of the invention, a computer-implemented method for establishing associations between scheduled events is provided. According to the method, input that specifies schedules for a plurality of events is received. Schedule data that indicates the schedules of the plurality of events is stored. Input that designates an association between a first event of said plurality of events and at least one other event of said plurality of events is received. Association data that indicates the association between the first event and the other event is stored.

Once the event data and association data have been stored, a user may cause the computer system to display the events associated with a selected event. Specifically, in response to user input the association data is read. It is then determined that the first event is associated with the other event based on the association data. A visual indication that the first event is associated with the other event is displayed on a display device.

According to another aspect of the invention, a warning indication is generated when the schedule of an event is changed if the event has been associated with other events. The warning indication may be, for example, a window showing the list of associated events. This warning indication reminds the user that the schedules for the related events may also have to be changed.

According to another aspect of the invention, rather than or in addition to designating associations between events, the user can designate associations between events and electronic documents. Association data that indicates the specified associations between events and electronic documents is stored. In response to user input, the computer system reads the association data and generates a display that indicates a list of the documents that are associated with a selected event. The user may also activate a user interface control to view the contents of a document that has been associated with an event.

According to yet another aspect of the invention, a computer system for performing calendaring functions is provided. The computer system includes an input device, an event information entry unit, a storage device, an event data generation unit and an association data generation unit. The various functional units may be implemented in software, hardware or a combination of hardware and software.

The event information entry unit is coupled to said input device. The event information entry unit receives information about a plurality of events from a user through the input device. The information includes schedules for the plurality of events.

The event data generation unit is coupled to the event information entry unit and to the storage device. The event data generation unit stores schedule data on the storage device. The schedule data represents the information about the plurality of events.

The association data generation unit is coupled to the event information entry unit and to the storage device. The association data generation unit stores on the storage device data that indicates associations between the plurality of events. Alternatively, the association data generation unit may store data that indicates associations between the plurality of events and a plurality of electronic documents, or data that indicates both associations between the plurality of events and associations between the plurality of events and a plurality of electronic documents.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3a illustrates the window of FIG. 2 after a user has activated a control to open a related event window;

FIG. 3b illustrates the window of FIG. 3a after a user has specified related events;

FIG. 3c illustrates the window of FIG. 2 after a user has activated a control to open a related document window;

FIG. 3d illustrates the window of FIG. 3c after a user has specified a related document;

DETAILED DESCRIPTION OF THE PREFERRED EMBODIMENT

A method and apparatus for associating scheduled events with related events and documents are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
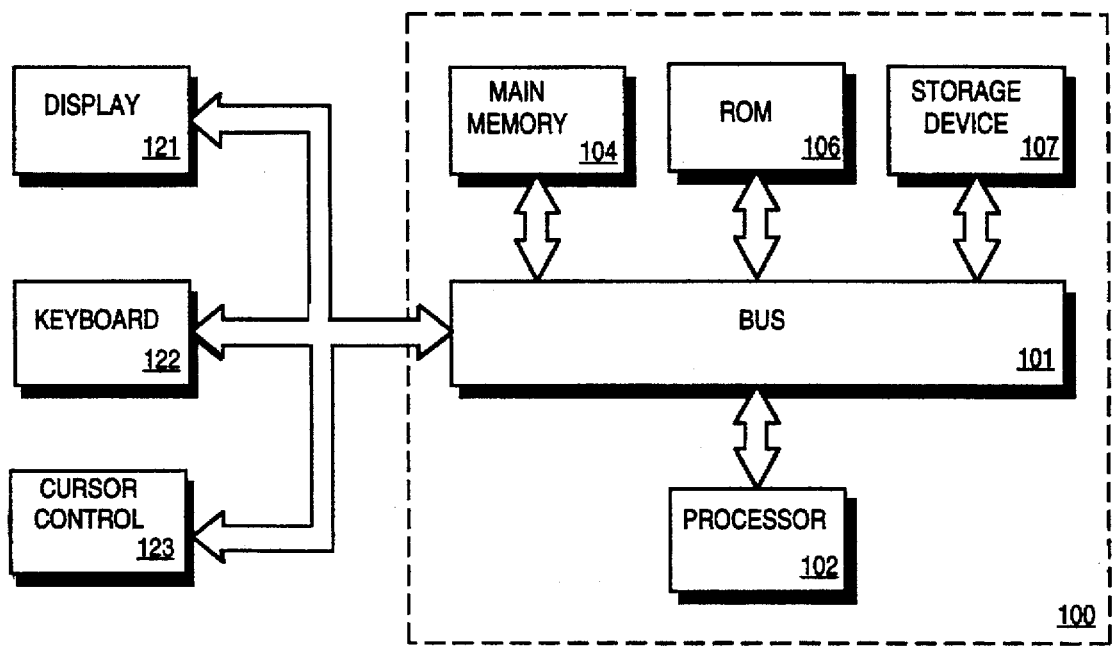
FIG. 1 is a block diagram illustrating a computer system that may be used to implement the present invention.

Referring to FIG. 1, a computer system 100 upon which an embodiment of the present invention can be implemented is shown. Computer system 100 comprises a bus or other communication means 101 for communicating information, and a processing means 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

In the currently preferred embodiment, computer system 100 is used for executing a calendar application. Processor 102 executes instructions stored in memory 104 which implement the calendar application. Execution of the instructions causes the calendar application to generate user interface controls on display 121 through which a user can enter information about events. In addition, the calendar application generates user interface controls which allow a user to create links between an event and related events, and between an event and related documents.

Figure 2:
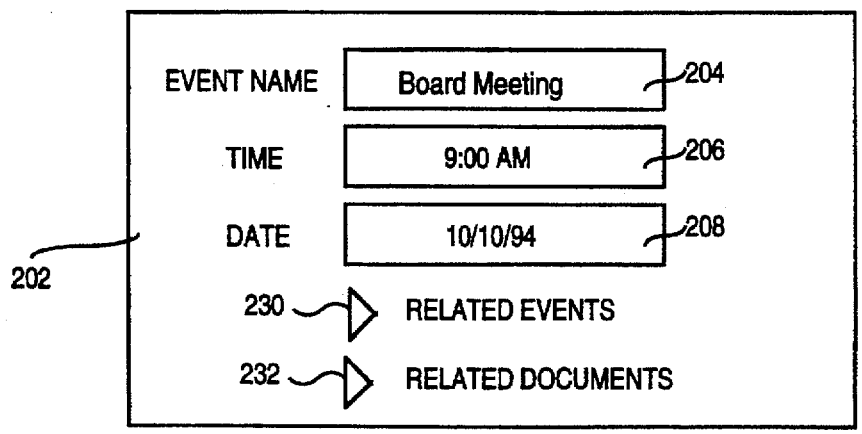
FIG. 2 illustrates a window through which a user may specify information about an event according to an embodiment of the invention.

Referring to FIG. 2, it illustrates a window 202 generated by a calendar application according to one embodiment of the present invention. Window 202 includes an event name control 204, a time control 206, a date control 208, a related events control 230 and a related documents control 232.

Event name control 204 is one or more user interface controls that allow a user to enter text that identifies an event. Event name control 204 may be, for example, an edit box into which a user may type or paste text. In the illustrated example, the text "Board Meeting" has been entered into event name control 204.

Time control 206 is one or more user interface controls that allow a user to specify a time at which an event will occur. In the illustrated example, "9:00 AM" has been entered to specify that the board meeting will occur at 9:00 a.m.

Date control 208 represents one or more user interface controls that allow a user to specify the date at which an event will occur. In the illustrated example, the text "Oct. 10, 1994" has been entered into date control 208 to specify that the board meeting will occur on Oct. 10, 1994.

It should be noted that while controls 204, 206, and 208 are illustrated as simple text boxes, other types and combinations of user interface controls may also be used. The present invention is not limited to any particular type or combination of user interface controls.

In the illustrated example, related events control 230 is a triangle that points toward the text "RELATED EVENTS". Similarly, related documents control 232 is a triangle that initially points to the text "RELATED DOCUMENTS". When either of controls 230 or 232 are selected by a user, a window that corresponds to the control is displayed within window 202.

FIG. 3a illustrates window 202 after a user has selected related events control 230. Upon the selection of related events control 230, the triangle changes to point downward, and a window 302 appears. Window 302 includes an event list region 304, and two control buttons 314 and 316. List region 304 includes an entry for each of the events which are in some way dependent on the occurrence of the event specified in window 202.

In the present example, it shall be assumed that a Mr. Fred Johnson will be in town only on the day of the board meeting and that the user of the calendar application desires to have lunch with Mr. Fred Johnson. It shall also be assumed that the user of the calendar application wishes to have lunch with a Mr. Bob Smith on October 10. However, because of the lunch appointment with Fred Johnson on October 10, the lunch appointment with Bob Smith has been set up for October 11.

Initially, no events have been designated as dependent on the board meeting. Therefore, related events list region 304 is empty. However, based on the scenario presented above, lunch with Fred Johnson will only occur on October 10 if the board meeting occurs on October 10. Therefore, the appointment to have lunch with Fred Johnson on October 10 is dependent on the board meeting. If the board meeting is rescheduled, then the lunch with Fred Johnson will also probably have to be rescheduled.

The lunch appointment with Bob Smith is indirectly dependent on the occurrence of the board meeting. Specifically, if the schedule for the board meeting changes, the lunch appointment with Fred Johnson will probably be canceled or moved to another date leaving October 10 open for lunch with Bob Smith. Since Bob Smith prefers to have lunch on October 10, the lunch appointment with Bob Smith should be moved to October 10 if the lunch appointment with Fred Johnson on October 10 is moved or canceled.

Figure 6:
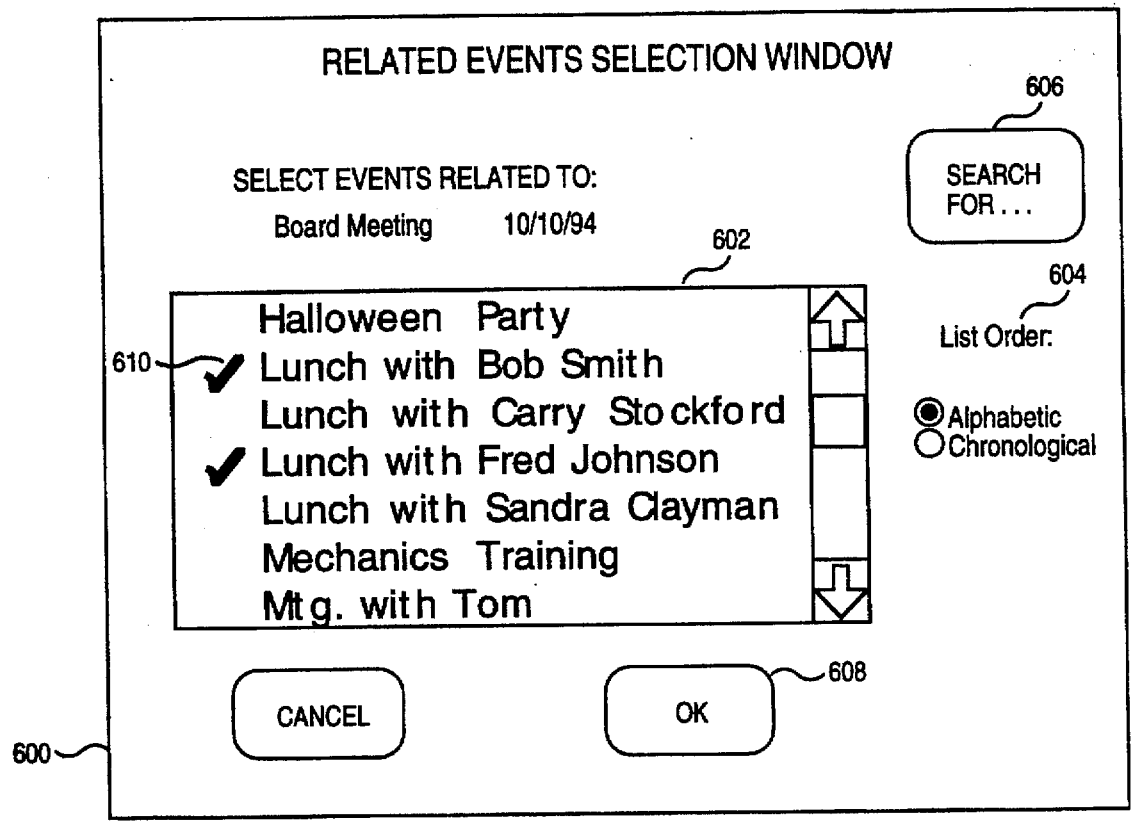
FIG. 6 illustrates a window for selecting events related to the current event.

Initially, list region 304 is empty because the user has not yet specified any dependent events. To identify a dependent event, the user selects control button 314. In response to the selection of control button 314, a popup window 600 (FIG. 6) appears with a list 602 of the events that have previously been entered by the user. Preferably, controls are provided which allow a user to quickly jump to particular entries in the list. For example, the calendar manager may sort the listed events alphabetically and allow a user to jump to the entries that begin with a particular letter when the user selects the key on keyboard 122 that corresponds to the letter. The window may also contain controls 604 that allow a user to determine the sort order of the displayed events. The calendar manager may also provide a search mechanism that allows the user to search the event identifiers for strings or substrings of text. Such a search mechanism may be invoked by selecting a search control 606 in window 600.

By manipulating the controls of window 600, a user specifies one or more dependent events. When a user selects an event, a checkmark 610 appears next to the entry of the selected event. Upon selecting the OK button 608, computer system 100 ceases to display the window 600 on display 121 and causes entries corresponding to the selected events to be displayed in list region 304.

FIG. 3b illustrates window 202 after a user has selected dependent events. In the present example, the events "Lunch with Fred Johnson" and "Lunch with Bob Smith" were selected as events that are dependent on the board meeting. Therefore, list region 304 includes an entry 306 that corresponds to the lunch with Fred Johnson event and an entry 308 which corresponds to the lunch with Bob Smith event.

Each of entries 306 and 308 include the name of the corresponding event and the date of the corresponding event. In addition, each entry in list region 304 has a check box and an expansion control. Specifically, entry 306 has a check box 310 and an expansion control 360. Entry 308 has a check box 312 and an expansion control 362.

Check boxes 310 and 312 allow a user to specify whether two events are mutually dependent. For example, if the board meeting will only occur if the user has lunch with Fred Johnson, and the user will only have lunch with Fred Johnson if the board meeting occurs, then the board meeting and the lunch appointment with Fred Johnson are mutually dependent. To specify that these events are mutually dependent, a user would select check box 310. In response to the selection of check box 310, the calendar application places an X in check box 310 and establishes the board meeting event as an event dependent on the "Lunch with Fred Johnson" event. Consequently, the need to separately specify that the board meeting event is a dependent event for the "Lunch with Fred Johnson" event is avoided.

Events that depend on the dependent events are displayed when the user selects an expansion control associated with the entry that corresponds to the dependent event. For example, expansion controls 360 and 362 allow a user to view the events that depend on the "Lunch with Fred Johnson" event and the events that depend on the "Lunch with Bob Smith" event, respectively.

Specifically, when a user selects expansion control 360, the orientation of expansion control 360 is changed to point downward and all of the events that depend on the "Lunch with Fred Johnson" event will be listed below entry 306. Similarly, if a user selects expansion control 362, the orientation of expansion control 362 is changed to point downward and all of the events that depend on the "Lunch with Bob Smith" event will be listed below entry 308.

The events that depend on the "Lunch with Bob Smith" event may also have dependent events. Such events are displayed when the user selects expansion controls associated with the entry that corresponds to the event on which they depend. According to one embodiment, expansion controls are only displayed next to entries that identify events that have dependent events.

Selection of a control 350 causes list region to be displayed that contains entries that indicate all of the events on which the current event depends. In the present example, the current event is the "Board Meeting" event which does not depend on any other event. Consequently, the list region that would appear in response to the activation of control 350 would be empty. Entries for events could be added to such a list region in the same manner as they are added to list region 304, as described above.

Selection of control button 316 allows a user to remove an entry from list region 304. A user would remove an entry from list region 304 when the event that corresponds to the entry is no longer dependent on the event specified in window 202. For example, if something came up that would not allow Bob Smith to have lunch on October 10, the lunch with Bob Smith event would take place on October 11 regardless of whether the schedule for the board meeting changed. Under these circumstances, a user would select entry 308 which corresponds to the lunch with Bob Smith, and then select control button 316 to cause entry 308 to be removed from list region 304.

Referring to FIG. 3c, it illustrates window 202 after a user has selected related documents control 232. When related documents control 232 is selected, the triangle points down and a window 320 appears in window 202 below related documents control 232.

Window 320 generally includes a document list region 322 and three control buttons 326, 328 and 354. Document list region 322 lists entries that correspond to documents that contain information about the event specified in window 202. For example, the user may have been notified about the board meeting by an electronic mail message. In addition to the time and date of the board meeting, the electronic mail message may also have included directions on how to get to where the board meeting was to take place, a map to where the board meeting was to take place, the agenda for the board meeting, and/or any number of other details relating to the board meeting.

Based on the information contained in the electronic mail document, the user enters the event label and schedule using controls 204, 206 and 208. Using currently available calendar applications, there is typically no convenient way to import the additional information contained in the electronic mail document into the calendar application. To address this shortcoming, the present invention allows a user to associate the electronic document that contains the information with the schedule information maintained by the calendar application.

Figure 7:
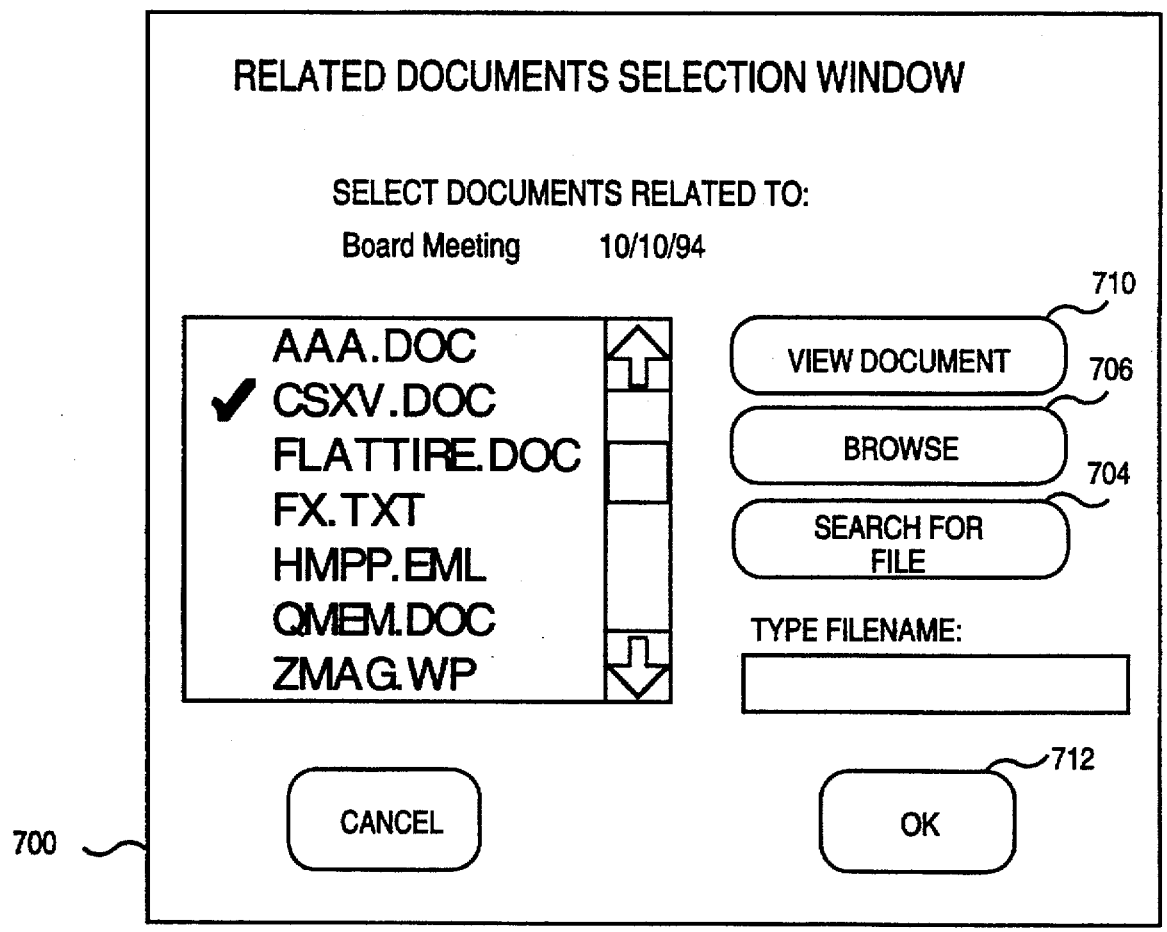
FIG. 7 illustrates a window for selecting documents related to the current event.

List region 322 contains a list of entries that correspond to electronic documents that have been associated with the events specified in window 202. Initially list region 322 will contain no entries. To associate an electronic document with the event specified in window 202, a user selects control button 326. In response to the selection of control button 326, a window 700 (FIG. 7) is displayed that allows a user to select one or more electronic documents. Preferably, the window contains controls that allow a user to conveniently find and identify documents on or accessible to computer system 100. Thus, the calendar manager may contain a file search mechanism that is activated in response to selection of a file search button 704. The calendar application may also have a browser mechanism that is activated in response to selection of a browser button 706 that allows a user to navigate through folders and directories on or accessible to computer system 100.

The calendar manager also provides a document viewer mechanism that is activated when a view document button 710 is selected. Upon the selection of view document button 710, the document viewer mechanism determines the document type of the currently selected document. The document viewer mechanism then generates a control signal to activate a viewing program that corresponds to the document type of the document. The viewing program opens the file associated with the currently selected document and displays the contents of the document.

Once the one or more electronic documents have been selected, the user selects an OK button 712 which causes window 700 to disappear. List region 322 now displays an entry for each of the selected documents, as shown in FIG. 3d. In the illustrated example, an entry 324 corresponds to and displays information about an electronic document with the name "CSXW.DOC". Entry 324 displays the name, type and date of the corresponding document.

A user may select control button 328 to remove an entry from list region 322 and thereby remove the association between the event specified in window 202 and the document that corresponds to the entry. Selection of view document button 354 invokes a document viewer mechanism which causes the contents of the currently selected document to be displayed, as described above with respect to view document button 710.

Figure 4:
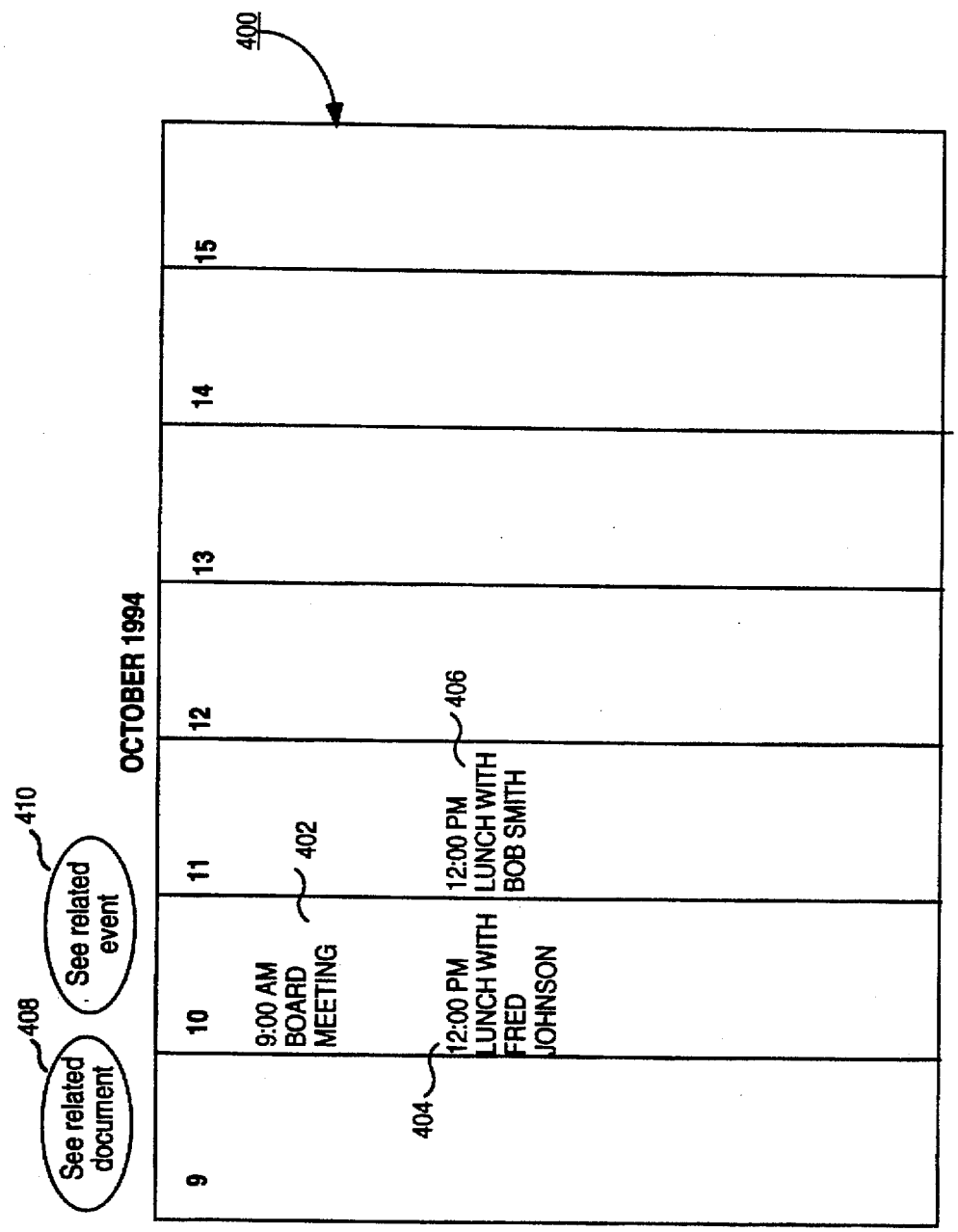
FIG. 4 illustrates a calendar generated according to an embodiment of the invention.

Referring to FIG. 4, it illustrates a calendar for the week of Oct. 9 through 15, 1994. The calendar application generates calendar 400 based on the event information entered by the user using the controls provided in window 202. Calendar 400 includes a visual event indicator for each of the events scheduled from Oct. 9 to Oct. 15, 1994. Specifically, an event indicator 402 corresponds to the "Board Meeting" event scheduled for 9:00 a.m. on October 10, an event indicator 404 corresponds to the "Lunch with Fred Johnson" event scheduled for noon on Oct. 10, 1994, and an event indicator 406 corresponds to the "Lunch with Bob Smith" event scheduled for noon on Oct. 11, 1994. Preferably, each event indicator is displayed in a region that corresponds to the date on which the event is scheduled to occur, and lists the time and name of the corresponding event.

The user may select an event by selecting the event indicator that corresponds to the event. If the currently selected event has one or more related documents, then a related document button 408 is displayed. If a user selects related document button 408, then a window that lists the documents related to the currently selected event (e.g. window 320) is displayed. Similarly, if the currently selected event has one or more related events, then a related event button 410 is displayed. If a user selects related event button 410, then a window that lists the events related to the currently selected event (e.g. window 302) is displayed. In addition, if a user double-clicks on any entry, then a window with detailed information about the event associated with the entry (e.g. window 202) is displayed.

Figure 8:
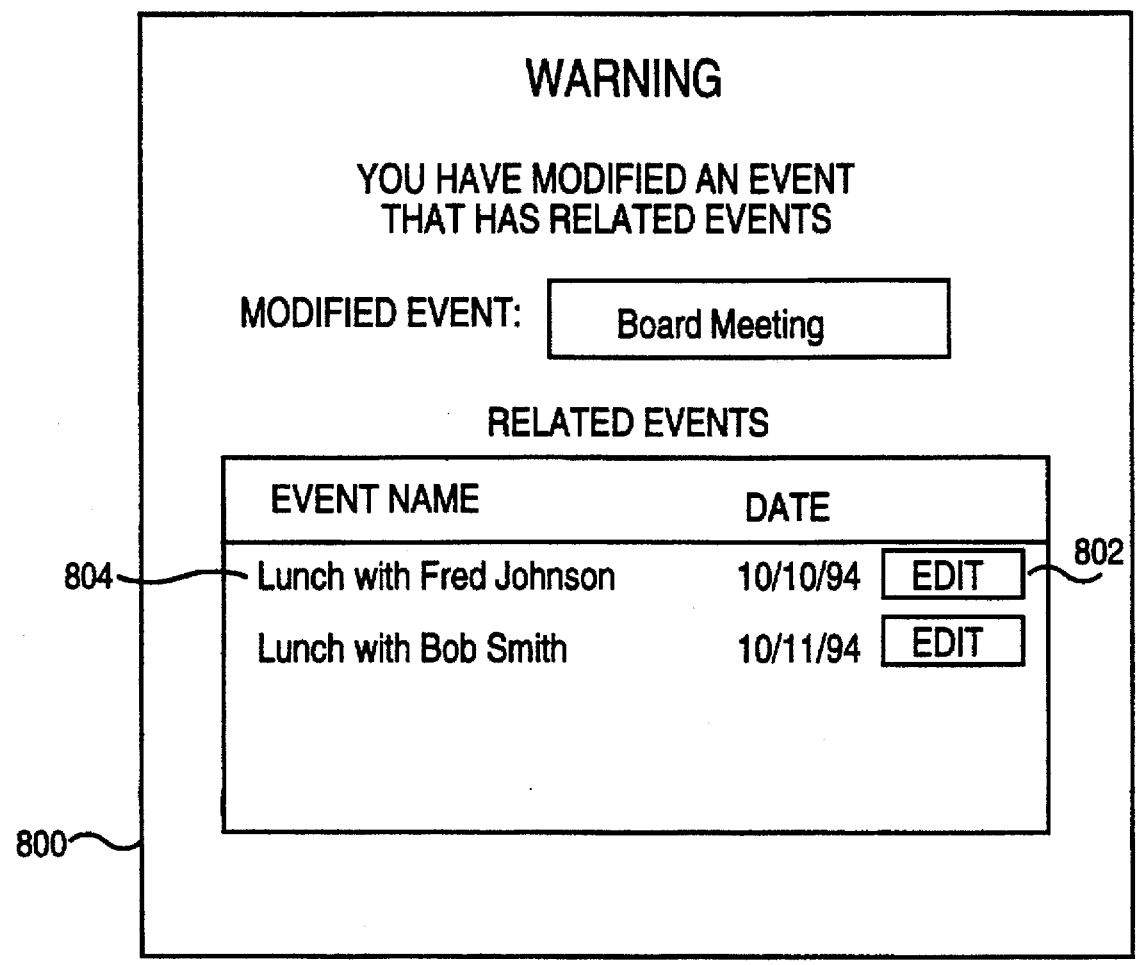
FIG. 8 illustrates a window for indicating that an event that was modified had dependent events which may also have to be modified.

When a user changes the schedule of an event that has dependent events, the calendar application generates an indication to notify the user that the changed event had dependent events. Such notification may take the form of a warning message window 800, as illustrated in FIG. 8. Having been reminded of the dependent events, the user may make appropriate changes to the schedules of the dependent events. For example, the user may select an edit button 802 next to the entry 804 of a related event. In response to the selection of edit button 802, computer system 100 generates a window that allows the user to edit the related event (e.g. window 202). Without such notification, the need to reschedule the dependent events may be overlooked.

Figure 5:
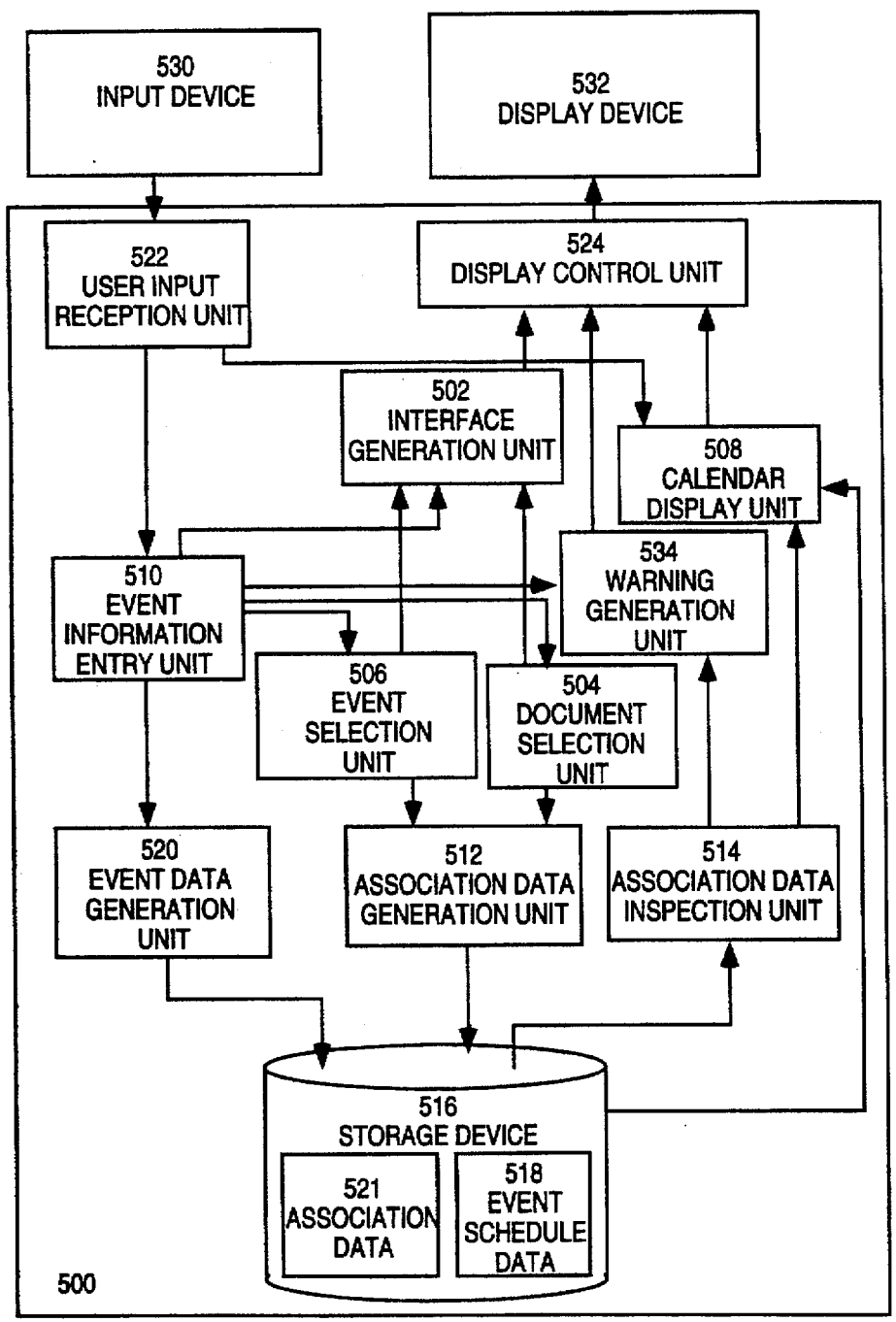
FIG. 5 is a functional block diagram of a computer system configured to execute a calendar manager application according to an embodiment of the invention.

Referring to FIG. 5, it illustrates a functional block diagram of a computer system 500 according to an embodiment of the present invention. Computer system 500 includes a user input reception unit 522, a display control unit 524, and a storage device 516. User input reception unit 522 receives data entered by a user through an input device 530. Display control unit 524 causes information to be displayed on display device 532.

Computer system 500 also includes a set of functional units coupled to user input reception unit 522, display control unit 524, and storage device 516 which implement the functions of the calendar application described above. Specifically, to enter information about an event, the user operates input device 530 to transmit control signals through user input reception unit 522 to event information entry unit 510. In response to these control signals, event information entry unit 510 transmits a signal to interface generation unit 502. Interface generation unit 502 transmits signals to display control unit 524 to cause user interface controls that allow a user to specify event information to be displayed on display device 532. The user interface controls for receiving event information may be, for example, window 202 and its associated controls illustrated in FIG. 2.

The user manipulates the user interface controls by causing input device 530 to transmit information to event information entry unit 510 through user input reception unit 522. In response to this user input, event information entry unit 510 transmits signals to interface generation unit 502 to cause the user's actions to be reflected on display device 532. In addition, event information entry unit 510 causes event data generation unit 520 to store on storage device 516 event schedule data 518 that reflects the event information entered by the user.

As illustrated in FIG. 2, the user interface controls for receiving event information include controls for specifying related events or related documents. When event information entry unit 510 detects that the user has selected a control for specifying a related event, event information entry unit 510 invokes an event selection unit 506. Event selection unit 506 transmits a signal to interface generation unit 502 to cause user interface controls for selecting a related event to be displayed on display device 532. These user interface controls for specifying a related event may be, for example, the user interface controls illustrated in FIG. 6. The user operates input device 530 to specify one or more related events through interaction with these user interface controls. Data that indicates the related events the user are sent from event selection unit 506 to association data generation unit 512. Association data generation unit 512 stores on storage device 516 association data 521 to indicate an association between the current event and the related events specified by the user.

Similarly, the user may operate input device 530 to select a user interface control for specifying a related document. In response to detecting this input, event information entry unit 510 invokes a document selection unit 504 which causes interface generation unit 502 to display user interface controls for specifying one or more related documents. Such controls may be, for example, those illustrated in FIG. 7. The user then operates input device 530 to generate data that specifies one or more related documents. Document selection unit 504 transmits that data to association data generation unit 512 which stores association data 521 that reflects the association between the current event and the related documents specified by the user.

When a user enters information that affects the schedule of an event, event information entry unit 510 invokes warning generation unit 534. Warning generation unit 534 causes association data inspection unit 514 to inspect the association data 521 on storage device 516 to determine if the event that is being altered has any associated events. If the event has associated events, warning generation unit 534 invokes interface generation unit 502 to cause a warning indication to be displayed on to display device 532. Preferably, the warning indication includes a list of the events that have been associated with the altered events.

The user may operate input device 530 to cause a calendar for a particular period of time to be displayed on display device 532. The input entered by the user is transmitted to calendar display unit 508 through user input reception unit 522. Calendar display unit 508 accesses the event schedule data 518 stored on storage device 516 and causes a calendar, such as that illustrated in FIG. 4, to be displayed on display device 532. Calendar display unit 508 causes association data inspection unit 514 to read the association data 521 to determine whether any of the events on the displayed calendar have been associated with documents or other events. Calendar display unit 508 may then generate an indication on the calendar to reflect these associations. For example, in the calendar shown in FIG. 4, the related document control button 408 and the related event control button 410 are generated by calendar display unit 508 based on association data 521.

While specific embodiments of the present invention have been described, various modifications and substitutions will become apparent by this disclosure. Such modifications and substitutions are within the scope of the present invention, and are intended to be covered by the following claims.

What is claimed is:

1. A method for establishing associations between scheduled events, the method comprising the computer-implemented steps of:

receiving input including date input and time input that specifies schedules for a plurality of events;

storing event schedule data including date data and time data that indicates the schedules of the plurality of events;

receiving event association input that designates an association between a first event of said plurality of events and at least one other event of said plurality of events;

storing event association data including data different from said event schedule data that indicates the association between the first event and the at least one other event; and receiving user associated event request input, in response to receiving said user associated event request input performing the steps of:

reading said event association data;

determining that said first event is associated with said at least one other event based on said event association data; and displaying on a display device a visual indication that said first event is associated with said at least one other event.

2. The method of claim 1 wherein said step of receiving user input includes receiving input that causes a change in the schedule of said first event.

3. The method of claim 2 further comprising the step of updating the schedule data to reflect the change in the schedule of the first event.

4. The method of claim 1 wherein the step of receiving input that designates an association between the first event of said plurality of events and at least one other event of said plurality of events includes the steps of:

receiving input that designates one or more events that depend on the first event; and receiving input that designates one or more events on which the first event depends.

5. The method of claim 4 wherein the step of displaying on a display device a visual indication that said first event is associated with said at least one other event includes the steps of:

- displaying a first list of entries that correspond to said one or more events that depend on the first event; and
- displaying a second list of entries that correspond to said one or more events on which the first event depends.

6. The method of claim 4 wherein:

- said one or more events that depend on the first event include a second event; and
- said step of receiving input that designates one or more events on which the first event depends includes the step of receiving input that specifies that said second event and said first event are mutually dependent.

7. The method of claim 1 wherein one or more events depend on a second event, and wherein:

- the step of receiving input that designates an association between the first event and at least one other event of said plurality of events includes receiving input that designates that said second event depends on said first event;
- the step of storing association data that indicates the association between the first event and the at least one other event includes storing association data that indicates that said second event depends on said first event; and
- the step of displaying on a display device a visual indication that said first event is associated with said at least one other event includes displaying a visual indication that indicates that said second event depends on the first event and that said one or more events depend on the second event.

8. The method of claim 1 wherein the step of displaying on a display device a visual indication that said first event is associated with said at least one other event includes displaying a list of events, wherein said list of events includes all events that depend on the first event and all events that depend on any of the events in the list of events.

9. The method of claim 1 further comprising the steps of:

- receiving input that designates an association between the first event and an electronic document;
- storing association data that indicates the association between the first event and the electronic document; and
- displaying on said display device a visual indication that said first event is associated with said electronic document.

10. A method for associating a scheduled event with a electronic document, the method comprising the computer-implemented steps of:

- receiving input that specifies a schedule for the scheduled event;
- storing schedule data that indicates the schedule of the scheduled event;
- receiving input that specifies that said scheduled event is associated with an electronic document;
- storing association data that represents an association between the scheduled event and the electronic document; and
- receiving user input, in response to receiving said user input performing the steps of:
  - reading said association data;
  - determining that said scheduled event is associated with said electronic document based on said association data; and
  - displaying on a display device a visual indication that the scheduled event is associated with the electronic document.

11. The method of claim 10 further comprising the steps of:

- displaying on said display a window that contains information about said scheduled event;
- displaying a user interface control within said window;
- receiving user input that selects said user interface control; and
- displaying the contents of said electronic document in response to receiving user input that selects said user interface control.

12. The method of claim 11 wherein the step of displaying the contents of said electronic document includes performing the steps of:

- determining a file type of said electronic document;
- determining a file viewer associated with said file type of said electronic document; and
- invoking said file viewer to cause said file viewer to open said electronic document and display the contents of said electronic document.

13. The method of claim 10 further comprising the steps of:

- receiving input that specifies that said scheduled event is associated with one or more additional electronic documents in addition to said electronic document;
- storing association data that represents an association between the scheduled event and the one or more additional electronic documents; and
- in response to receiving said user input performing the steps of:
  - determining that said scheduled event is associated with said one or more additional electronic documents based on said association data; and
  - displaying on said display device a visual indication that the scheduled event is associated with said one or more additional electronic documents.

14. A computer system comprising:

- an input device;
- an event information entry unit coupled to said input device, the event information entry unit receiving information about a plurality of events from a user through the input device, said information including schedules for said plurality of events;
- a storage device;
- an event data generation unit coupled to said event information entry unit and to said storage device, said event data generation unit storing schedule data on said storage device, said schedule data representing said information about said plurality of events;
- an association data generation unit coupled to said event information entry unit and to said storage device, said association data generation unit storing on said storage device data that indicates associations between said plurality of events.

15. The computer system of claim 14 wherein said association data indicates that a first event of said plurality of events depends on a second event of said plurality of events, the computer system further comprising:

- an association data inspection unit coupled to said storage device for reading said association data; and
- a warning generation unit for generating a warning indication when the schedule of said second event is modified by said user.

16. The computer system of claim 15 further including a display device, wherein:
   said warning generation unit is coupled to said display device; and
   said warning indication is a visual indication on said display device, said visual indication indicating that said first event depends on said second event.

17. The computer system of claim 14 further including:
   a memory containing a sequence of instructions; and
   a processor coupled to said memory;
   wherein said event information entry unit, said event data generation unit and said association data generation unit are implemented by causing said processor to read and execute said sequence of instructions.

18. A computer system comprising:
   an input device;
   an event information entry unit coupled to said input device, the event information entry unit receiving information about a plurality of events from a user through the input device, said information including schedules for said plurality of events;
   a storage device;
   an event data generation unit coupled to said event information entry unit and to said storage device, said event data generation unit storing schedule data on said storage device, said schedule data representing said information about said plurality of events;
   an association data generation unit coupled to said event information entry unit and to said storage device, said association data generation unit storing on said storage device data that indicates associations between said plurality of events and a plurality of electronic documents.

19. The computer system of claim 18 wherein the plurality of electronic documents includes a first electronic document that is associated with a first event of said plurality of events, the computer system further including:
   a display device;
   an interface generation unit coupled to said display device;
   said interface generation unit generating on said display device a window associated with said first event;
   said interface generation unit generating a plurality of user interface controls in said window; and
   said plurality of user interface controls including a control for displaying the contents of said first electronic document.

20. The computer system of claim 18 wherein said association data generation unit stores on said storage device data that indicates associations between events of said plurality of events.

21. A computer program product comprising:
   a computer usable medium having computer readable code embodied therein for establishing associations between scheduled events, the computer program product comprising:
      computer readable program code devices configured to cause a computer to receive input that specifies schedules for a plurality of events;
      computer readable program code devices configured to cause a computer to store schedule data that indicates the schedules of the plurality of events;
      computer readable program code devices configured to cause a computer to receive input that designates an association between a first event of said plurality of events and at least one other event of said plurality of events;
      computer readable program code devices configured to cause a computer to store association data that indicates the association between the first event and the at least one other event; and
      computer readable program code devices configured to cause a computer to receive user input and, in response to receiving said user input, to perform the steps of:
         reading the association data;
         determining that said first event is associated with said at least one other event based on said association data; and
         displaying on a display device a visual indication that said first event is associated with said at least one other event.

22. The computer program product of claim 21 wherein said computer readable program code devices configured to cause a computer to receive user input include computer readable program code devices configured to cause a computer to receive input that causes a change in the schedule of said first event.

23. The computer program product of claim 22 further comprising computer readable program code devices configured to cause a computer to update the schedule data to reflect the change in the schedule of the first event.

24. The computer program product of claim 21 wherein the computer readable program code devices configured to cause a computer to receive input that designates an association between the first event of said plurality of events and at least one other event of said plurality of events include:
   computer readable program code devices configured to cause a computer to receive input that designates one or more events that depend on the first event; and
   computer readable program code devices configured to cause a computer to receive input that designates one or more events on which the first event depends.

25. The computer program product of claim 24 wherein the computer readable program code devices configured to cause a computer to display on a display device a visual indication that said first event is associated with said at least one other event include:
   computer readable program code devices configured to cause a computer to display a first list of entries that correspond to said one or more events that depend on the first event; and
   computer readable program code devices configured to cause a computer to display a second list of entries that correspond to said one or more events on which the first event depends.

26. The computer program product of claim 24 wherein:
   said one or more events that depend on the first event include a second event; and
   said computer readable program code devices configured to cause a computer to receive input that designates one or more events on which the first event depends include computer readable program code devices configured to cause a computer to receive input that specifies that said second event and said first event are mutually dependent.

27. The computer program product of claim 21 wherein one or more events depend on a second event, and wherein:
   the computer readable program code devices configured to cause a computer to receive input that designates an association between the first event and at least one other event of said plurality of events include computer readable program code devices configured to cause a computer to receive input that designates that said second event depends on said first event;

the computer readable program code devices configured to cause a computer to store association data that indicates the association between the first event and the at least one other event include computer readable program code devices configured to cause a computer to store association data that indicates that said second event depends on said first event; and the computer readable program code devices configured to cause a computer to display on a display device a visual indication that said first event is associated with said at least one other event include computer readable program code devices configured to cause a computer to display a visual indication that indicates that said second event depends on the first event and that said one or more events depend on the second event.

28. The computer program product of claim 21 wherein the computer readable program code devices configured to cause a computer to display on a display device a visual indication that said first event is associated with said at least one other event include computer readable program code devices configured to cause a computer to display a list of events, wherein said list of events includes all events that depend on the first event and all events that depend on any of the events in the list of events.

29. The computer program product of claim 21 further comprising:

computer readable program code devices configured to cause a computer to receive input that designates an association between the first event and an electronic document;

computer readable program code devices configured to cause a computer to store association data that indicates the association between the first event and the electronic document; and computer readable program code devices configured to cause a computer to display on said display device a visual indication that said first event is associated with said electronic document.

* * * * *